United States Patent
Patton et al.

[11] Patent Number: 5,913,976
[45] Date of Patent: Jun. 22, 1999

[54] FIBER OPTIC HANDLING AND COATING FIXTURE

[75] Inventors: Scott L. Patton, Westerly, R.I.; Robert M. Payton, New London, Conn.

[73] Assignee: The United States of America as represented by the Secretary of the Navy, Washington, D.C.

[21] Appl. No.: 08/708,423

[22] Filed: Sep. 9, 1996

[51] Int. Cl.⁶ .............................. B05C 3/00; B05C 19/02
[52] U.S. Cl. ................... 118/429; 118/420; 118/DIG. 18; 118/DIG. 19; 118/500; 65/501; 425/121; 425/122; 425/123; 28/217; 28/220; 28/246; 28/247; 28/258; 28/271; 28/272; 427/163.2; 427/169; 427/172; 427/256; 427/389.8; 427/389.9
[58] Field of Search ..................................... 118/420, 429, 118/DIG. 18, DIG. 19, 500; 65/501; 427/163.2, 169, 172, 256, 389.8, 393.5, 389.9, 430.1, 508, 512, 513; 425/121, 122, 123; 57/295; 28/217, 220, 246, 247, 258, 271, 272

[56] References Cited

U.S. PATENT DOCUMENTS

| | | |
|---|---|---|
| 2,980,956 | 4/1961 | Whitehurst et al. .............. 118/DIG. 18 |
| 4,525,312 | 6/1985 | Jones ..................................... 427/163.2 |
| 4,565,153 | 1/1986 | Corley ....................................... 118/420 |
| 4,643,126 | 2/1987 | Wilkinson et al. ....................... 118/420 |

*Primary Examiner*—Peter Chin
*Assistant Examiner*—Michael P. Colaianni
*Attorney, Agent, or Firm*—Michael J. McGowan; Prithvi C. Lall; Michael F. Oglo

[57] ABSTRACT

The invention comprises a fixture and method for holding optical waveguides, such as fiber optic cable, in a relatively stable fashion for processing. The fixture includes a first frame and a second frame, releasably securable to the first frame to form a unitary structure. Chambers disposed in at least one of the frames are adapted for removably receiving optical fiber cable when the first and second frames are released from one another and for securely retaining with molding material optical fiber cables when the first and second frames form the unitary structure. A process area is defined in the unitary structure such that segments of optical fiber cables secured therein are accessible in the process area for processing. An optional coating fixture is securable to said unitary structure for forming with a molding material a protective coating about the cable segments in the processing area.

18 Claims, 3 Drawing Sheets

FIBER OPTIC HANDLING AND COATING FIXTURE

CROSS REFERENCE TO RELATED PATENT APPLICATIONS

The instant application is related to two co-pending U.S. patent applications entitled METHOD AND APPARATUS FOR PHOTOBLEACHING PATTERNS IN IRRADIATED OPTICAL WAVEGUIDES (Navy Case No. 74919Ser. No. 08/708,422 and filing date of Sep. 9, 1996); and METHOD AND APPARATUS FOR IRRADIATING PATTERNS IN OPTICAL WAVEGUIDES CONTAINING RADIATION SENSITIVE CONSTITUENTS (Navy Case No. 74968 Ser. No. 08/709,624 and filing date of Sep. 9, 1996) having same filing date.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates generally to a method and apparatus for handling optical waveguide substrates and, more particularly, to a fixture and a method for handling optical fibers and similar waveguides for processing.

2. Description of the Prior Art

Optical waveguides, including fiber and fiber-like substrates such as optical fibers, are known. It is also known to change the useful properties or characteristics of selected areas of an optical waveguide by first exposing the optical core and/or the optically transmissive cladding to permit processing of the core and/or the cladding. For example, U.S. Pat. No. 4,182,664 to Maklad et al., discloses processing by which optical fibers become relatively stable to nuclear radiation loss by pre-irradiating the fibers.

U.S. Pat. No. 4,793,680 to Byron discloses the formation of a grating by directing a pulsed high-power laser beam on or near an exposed end of an optical waveguide to create rippled discontinuities on the waveguide. Other processes form optical patterns of varied optical densities or refractive indexes. U.S. Pat. No. 4,403,031 to Borrelli et al. discloses a process for forming optical patterns of varied optical densities or refractive indexes by exposing porous glass impregnated with a photolyzable organometallic compound to photolyzing light.

Other processing forms Bragg gratings in the core and/or cladding layers of optical fibers. These fibers are particularly adapted for use in strain sensing, stress sensing, temperature sensing, pressure sensing, vibration sensing, and other sensors. In one such method, apparatus directs coherent green light (approximately 488 nm wavelength) into both ends of a germania doped optical fiber. The resulting interference pattern photobleaches the core of the fiber and thereby creates a grating.

U.S. Pat. Nos. 5,066,133 to Brienza, 5,061,032 to Meltz et al., 5,042,897 to Meltz et al., 4,793,930 to Blyler, Jr. et al., and 4,725,110 to Glenn et al. disclose apparatus for focusing and directing split beams of coherent light in the ultraviolet region (approximately 244 nm wavelength) onto a specific region of a germania doped optical fiber. An analogous process disclosed in U.S. Pat. No. 5,104,209 to Hill et al. forms Bragg gratings in europium and alumina doped fibers.

In general, such processing of optical waveguides comprises successive steps. When more than one region or segment requires processing, each region is processed successively. Sequential processing frequently introduces other perturbations including, for example, dimensional variations, planar variations, and consistency variations.

The consecutive nature of these operations also increases the time needed for the processing of individual fibers. Repeated handling of the fiber increases the potential of breakage in the processed region thereby limiting the amount of processing or requiring extra care in the handling of the fiber.

As a final step in processing, it is often desirable to apply or reapply a protective coating over the processed waveguide. Various methods which are known or suggested for applying such protective coatings include extrusion, overmolding, and vapor-phase deposition processes. Extrusion processes generally involve drawing the fiber individually through the coating material and risk fiber breakage. Overmolding processes involve disposing a pre-formed, over-sized covering or tube over the fiber and filling the tube with a molding material which bonds the tube to the fiber. The overmolding process frequently introduces undesirable mechanical properties and also increases the potential for fiber breakage. Vapor-phase deposition techniques typically deposit very thin coatings (i.e., in the micron range) of materials generally not useful for protective coatings for such fibers.

U.S. Pat. No. 4,040,691 to David et al. discloses a fixture in the form of a waveguide holder-humidifier comprising a rectangular container and a hinged top. Holes in two sides of the container enable a liquid sample to pass through the container. U.S. Pat. No. 4,793,681 to Barlow et al. discloses a relatively complicated splice cradle for holding fiber optic splice segments in place. U.S. Pat. No. 4,721,586 to Kakii et al. discloses a mold which mounts optical fibers of a cable as part of a method for forming cable plugs. A resin is introduced into the mold to solidify about multiple optical fibers of a single cable which are then cut apart to form two plugs. U.S. Pat. No. 4,750,804 to Osaka et al. discloses a jig securing single or plural optical fiber cores for fusion welding with other similarly secured cores.

The foregoing references fail to provide a fixture for holding optical waveguides for processing to alter the properties of optical waveguides. They fail to provide a fixture that is relatively simple to use and that reduces the direct handling of optical waveguides during processing and that enables concurrent processing by a variety of techniques of waveguides secured in the fixture. Additionally, the prior art fails to suggest a fixture that is simple to use and that facilitates the formation of a protective coating about exposed portions of the optical waveguide.

SUMMARY OF THE INVENTION

An object of the present invention is to provide a fixture for releasably holding optical waveguides in a secure manner during processing that alters the properties of such waveguides.

Another object of the present invention is to provide an optical waveguide processing fixture that is relatively simple to use and that reduces the direct handling of optical waveguides.

Still another object of the present invention is to provide a fixture that enables the concurrent processing of optical waveguides secured therein by various techniques.

A further object of the present invention is to provide a handling fixture that can be used to improve the consistency of optical waveguide processing and provide a coating fixture for coating exposed portions of optical waveguides with a protective coating.

One aspect of the present invention comprises a fixture having a first and a second frame to hold fiber optical cable with a cured molding material for processing. First and second spaced members of the first frame with at least one surface in a common plane define opposite boundaries of a processing aperture. A set of first and second chambers have openings in the planar surfaces of the first and second spaced member, respectively, and align along a support axis spanning the processing aperture. Each of the chambers receives the molding material and positions the fiber optic cable along the support axis spanning the processing aperture. The second frame attaches to the first frame for overlying at least the planar surfaces of the first and second members thereby to close the chambers.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
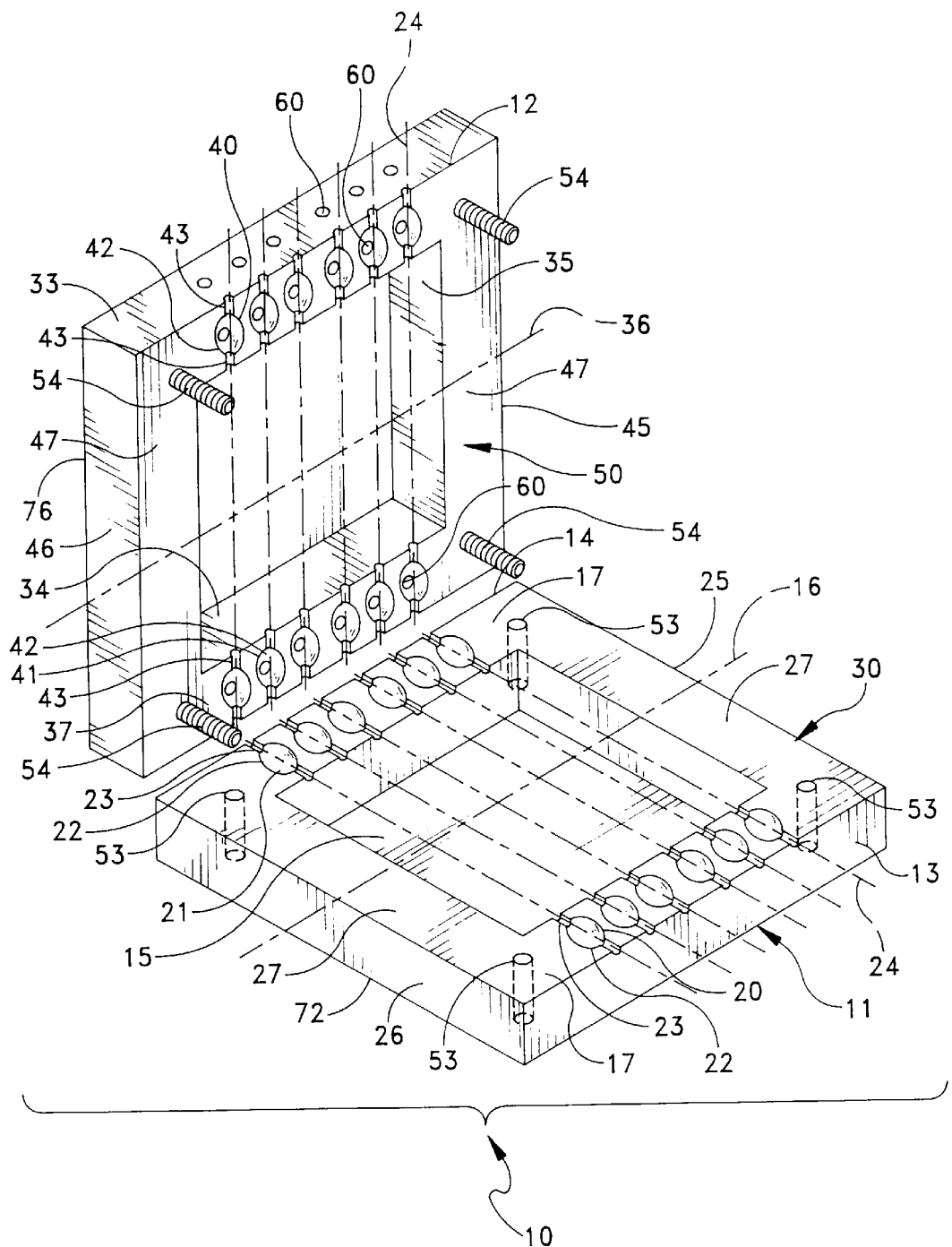
FIG. 1 is a perspective view of a processing fixture, according to the present invention, in a separated form.

In FIG. 1 a processing fixture 10 constructed in accordance with this invention that captures portions of optical waveguides formed of fiber optic cable in molded plastic. The fixture 10 comprises a first frame 11 and a second frame 12 that are shown as being separated with respect to each other and that are adapted for being secured together as a unitary structure.

The first frame 11 includes first and second spaced members 13 and 14. The members 13 and 14 define opposite boundaries of a processing aperture 15 about a central axis 16 intermediate the members and have surfaces 17 lying in a common plane. A plurality of sets of first and second chambers 20 and 21 are formed in and spaced along the first and second members, respectively. Each chamber has an opening in the planar surface 17 and each pair of chambers 20 and 21 in a set lies along one of a plurality of spaced support axes 24. Each of the chambers 20 and 21 comprises a central cavity 22 disposed between opposite axially extending elongated slots 23. The cavity 22 and corresponding slots 23 lie along the support axis 24 for that set. The slots 23 have cross-sections that correspond to the cross section of a optical fiber being processed. The support axis 24 is angularly displaced with respect to the central axis 16 and spans the processing aperture 15. Normally the support axes 24 will be at right angles to the central axis 16. Two spaced side members 25 and 26 extend between the members 13 and 14 and define the remaining boundaries of the processing aperture 15. The members 25 and 26 also have surfaces 27 that are coplanar with the surfaces 17 to define a mating surface 30.

Still referring to FIG. 1, the second frame 12 for attaching to the first frame 11 and overlying the mating surface 30 preferably corresponds in size and form with the frame 11. That is, the frame 12 includes first and second spaced members 33 and 34, which define opposite boundaries of a processing aperture 35 about a central axis 36 intermediate the members. The members have surfaces 37 lying in a common plane. First and second chambers 40 and 41 in the first and second members, respectively, open at the planar surface 37. Each of the chambers 40 and 41 comprises a central cavity 42 disposed between opposed slots 43 that lie along a corresponding one of the support axes 24 and register with corresponding chambers 20 and 21 when the frames 11 and 12 are assembled. Two spaced side members 45 and 46 extend between the members 33 and 34 to further define the boundaries of the processing aperture 35. The members 45 and 46 also have surfaces 47 which are coplanar with the surfaces 37 to define a mating surface 50.

Suitable mating means, such as apertures 53 and locating pins 54 formed in the frames 11 and 12, respectively, position the frames along the mating surfaces 30 and 50. For example, threaded ends of locating pins 54 can extend through the apertures 53 and receive nuts (not shown) to releasably secure the frames 11 and 12 together along the mating surfaces 37 and 47 to form a unitary structure in which the processing apertures 15 and 35 align. Other securing or locking mechanisms can also be used.

Figure 2:
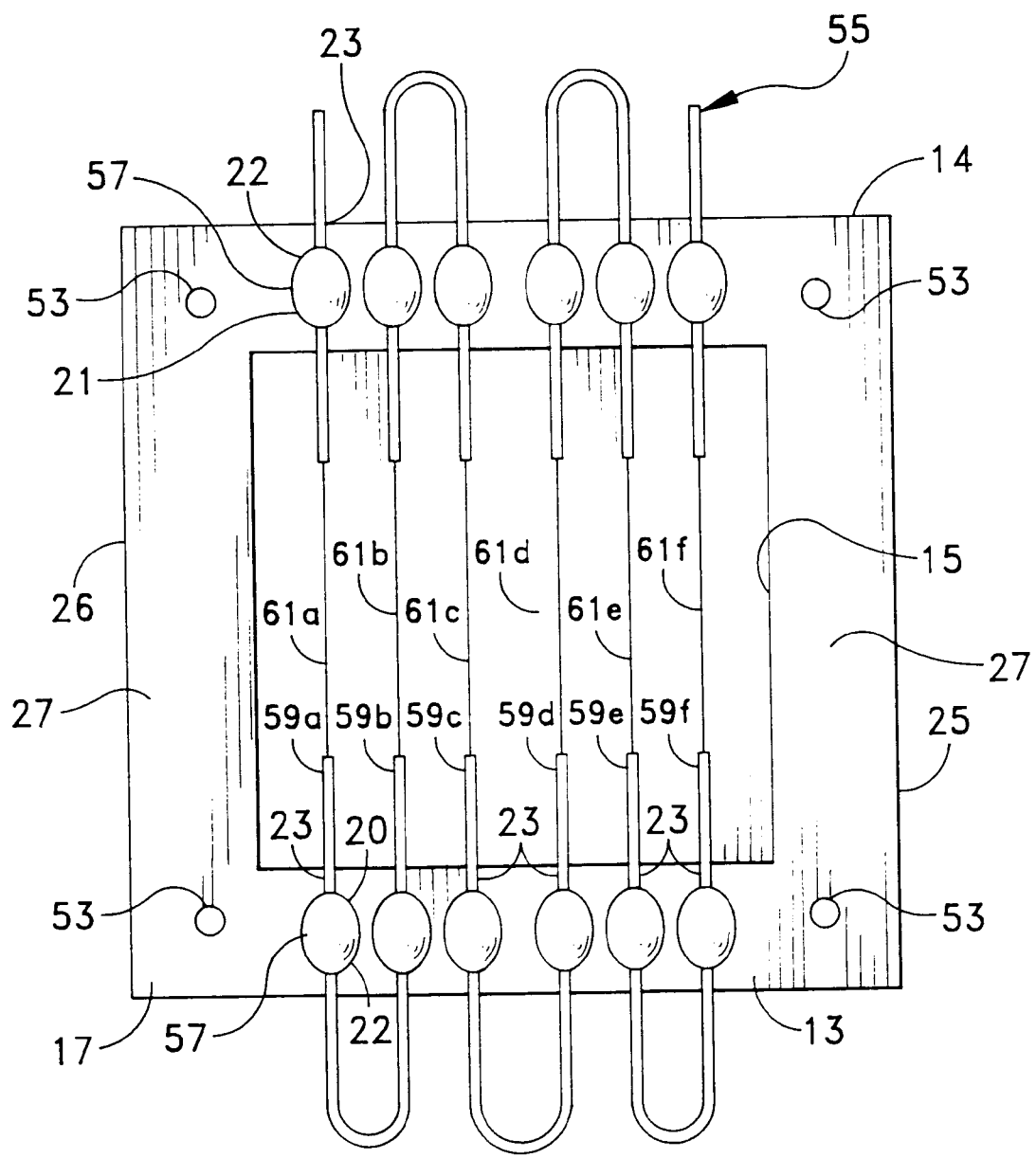
FIG. 2 is a top plan view of one of the frames of the processing fixture of FIG. 1.

In the specific embodiment depicted in FIGS. 1 and 2, the mating surfaces 30 and 50 include six sets of chambers 20 and 21 and six sets of chambers 40 and 41, respectively, formed in the parallel members 13, 14, 33, and 34. As previously discussed, each of the chambers 20 and 40 in the parallel members 13 and 33, respectively, align with one of the chambers 21 and 41 in the parallel members 14 and 34, respectively. Likewise, each set of the chambers 20 and 21 in the parallel members 13 and 14 align and register with respective ones of the sets of the chambers 40 and 41 in the parallel member 33 and 34.

This arrangement provides, upon securing the frames 11 and 12 together, segments of a continuous optical fiber that extend between the chambers 20, 21, 40 and 41 along support axes 24. Each segment spans the processing area of the fixture 10 defined by the processing apertures 15 and 35. Each segment also can be spaced from any adjacent segment. When the frames 11 and 12 are separated, the ready access to the chambers 20, 21, 40, and 41 facilitates the insertion and removal of optic fiber cables from the fixture 10.

In using the fixture 10, the frames 11 and 12 are separated to provide access to one set of chambers, such as chambers 20 and 21 in the frame 11 as shown in FIG. 2. Depending upon the molding materials, a release agent may be applied to the chambers 20 and 21 and corresponding slots. The user then lays along each of the support axes 24 a segment of optical fiber. In FIG. 2, a single optical fiber cable 55 snakes successively through each set of the chambers 20 and 21 in the frame 11. This arrangement positions segments 59a–59f in the processing aperture 15 along the different support axes 24.

Continuing to refer to FIG. 2, the user pours a molding material 57 around the portions of the optical fiber cable 61 in the cavities 22 and allows the molding material to cure while maintaining some tension on the ends of each segment 56a through 56f outside the frame 11. The molding material 57 should be compatible with the material forming the optical fiber or any protective coating on the cable. Curable resins, such as urethane and RTV silicone are examples of acceptable materials. Once cured, the material 57 secures the optical fiber 55 in the cavities 21.

Alternatively, molding material 57 may be added to the cavity 22 first and cured. The fiber cable 55 then can be laid into the chambers 20 and 21 of the frame 11 and secured to the solidified molding material by a suitable bonding agent, such as a cyanoacrylate glue. In any event, the molding material 57, however formed and secured to portions of the cable 55, functions to securely retain the optical fiber cables in the fixture 10 without slippage of the segments in the process area.

After securing the frames 10 and 12 together, the molding material bears against the walls of the cavities 42 to inhibit movement of the segments 59a–59f. Additional molding material 57 can be injected into the cavities 22 and 42 of the registered chambers to improve the securement of the segments 59a–59f in the fixture 10. For example, injection apertures 60, as depicted in FIG. 1, enable injection of the additional molding material into the closed chamber 24. Once secured, the segments are now ready for processing. After processing, separating the frames 11 and 12 enables removal of the cable 55 with the segments of molding material 57 at each end of the processed segment.

Thus, a fixture constructed in accordance with this invention provides a device for securing one or more optical fiber segments within the fixture. Securing portions of the fiber to the molding material in the cavities together with the sizing of the end slots of the chamber provides a relatively stable and stationary cable segment in the process area. Additionally, it will be appreciated that within the scope of this invention, one of the frames 11 and 12 could be formed with chambers sufficiently deep to receive the fiber optic cable and molding material therein with the other frame formed as a cover without any chambers.

The fixture of this invention permits the steps of various method of processing fiber optic cables to be applied to the segments in the process area concurrently or sequentially. This reduces the likelihood of variations, errors and the like in processed segments. The fixture also reduces handling of the segments during processing reducing the likelihood of damage to the optical fiber cables as well as other errors induced by the stretching and twisting of the optical fiber cables.

Moreover, once properly positioned in the frame the processing of desired portions can be accomplished without further measuring or reorienting of the optical fiber cables themselves. Even in the case of sequential processing or processing only selected ones of the segments, the fixture reduces the direct handling of the optical fiber cables to reduce the likelihood of breakage, while improving the control over the segments.

Figure 3:
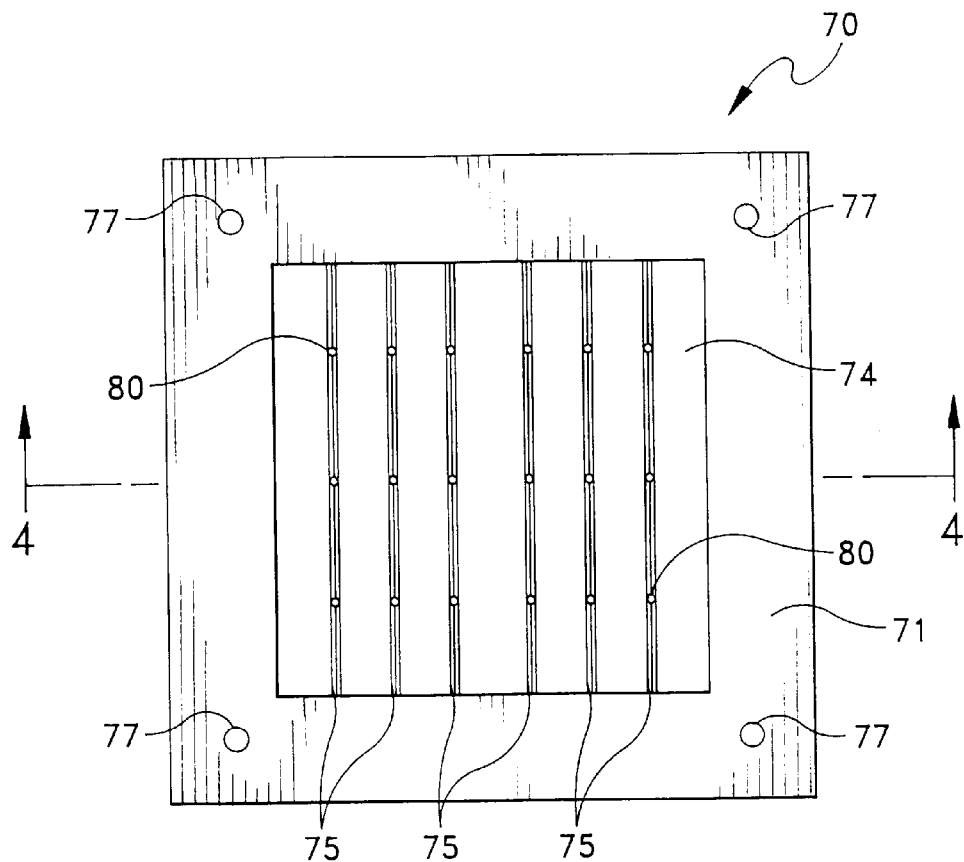
FIG. 3 is a top plan view of one unit of a coating fixture that is usable with the fixture of FIG. 1 and is constructed in accordance with another aspect of the present invention.
Figure 4:
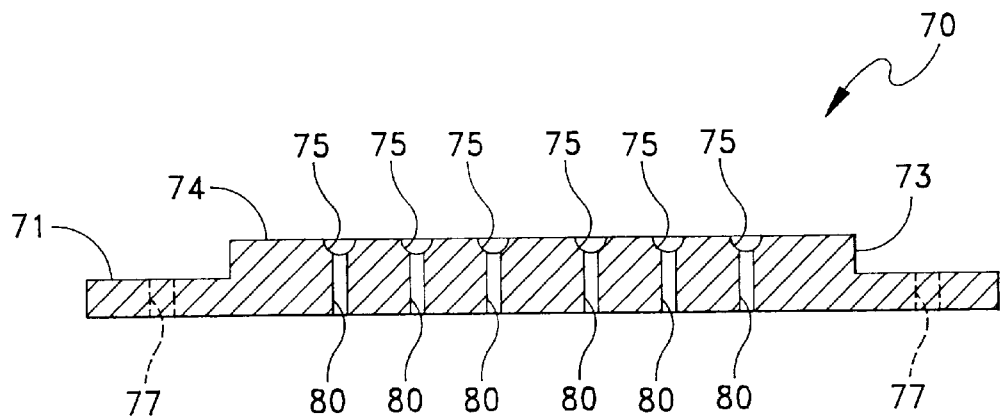
FIG. 4 is a sectional view of the coating unit of FIG. 3 taken along the section line 4—4.

As seen in FIG. 2, the reduced diameter of regions 61a–61f represent the removal of some layers from the cable 55 in each of these regions. Forming a protective coating over such regions is often desirable. FIG. 3 and FIG. 4 depict a coating unit 70 that, with a second mating unit (not shown), forms a coating fixture according to the present invention for use with the unitary structure of fixture 10.

Specifically, the unit 70 includes a first surface 71 for positioning along a surface 72 opposite the mating surface 30 of frame 11 (FIG. 1). A central raised portion 73 extends from the surface 71. The portion 73 is sized and shaped to extend into the portion of the processing area 15 of the fixture 10 (FIG. 1). The upper surface 74 of the portion 73 includes a series of grooves 75 that align with and partially surround the individual segments 61a through 61f.

The second coating unit (not shown) is positionable on the surface 76 (FIG. 1) opposite the mating surface 30 of the frames 12 and it, like the unit 70, includes a raised portion with grooves formed therein for extension into the process area of the fixture 10 defined by the process aperture 15 (FIG. 1). The first unit 70 and the second unit include means for securing the coating units on the fixture 10. In this instance, the unit 70 includes apertures 77 formed therein for receiving the locating pins 54 (FIG. 1) of frame 12 to position and secure the unit 70 to the fixture 10. Other arrangements for seating and securing the first and second units on the corresponding frame known in the art are contemplated hereby and will not be further discussed.

When the first unit 70 and the second unit are operatively positioned on the fixture 10 with the frames 11 and 12 (FIG. 1) secured together, the grooves of both of the coating units register to form cavities that span the process area 15 of the fixture 10 along the support axes 24 (FIG. 1). These cavities envelop any optical fiber cables segments disposed in the process area (e.g., segments 59a–59f of FIG. 2). Injection ports 80 in the coating unit 70 enable introduction of a suitable molding material into each of the cavities. Filling the cavities with the molding material and solidifying it forms a protective coating over the cable segments in the cavities. Detaching the coating units from the fixture 10 and opening the fixture 10 enables access to and removal from the chambers 20, 21, 40 and 42 the processed optical fiber cable segments with the protective coating formed thereon.

The molding material used to form the protective coating should be compatible with the material forming the optical fiber or any protective coating on the cable. Curable resins, such as urethane and RTV silicone are examples of acceptable materials. As previously indicated it may be desirable to coat each cavity surface with a release agent prior to assembling the unit 70 and the mating unit. The cross-section of the ducts preferably conform to the original or desired shape of the protective coating on the optical fiber cables (e.g., cylindrical) so that the molding material solidifies in such shape. The coating fixture, thus, enables coating or re-coating optical fiber cable segments with a protective coating.

The advantages of the present invention should now be apparent. For example, multiple processing steps can be performed on segments secured in the fixture without further handling of the optical fiber cable. The fixture enables concurrent processing of multiple segments of a single or plural optical fiber cables, which improves efficiency and reduces variations resulting from variations in the processing steps. Finally, the fixture enable the coating or re-coating of processed optical fiber cables as part of a single continuing process while the cables are positioned within the fixture.

In summary, this invention comprises a fixture which secures a plurality of optical fiber cable segments for processing. The fixture includes a structure mounting optical fiber cable segments in a processing area which are readily accessible for processing in accordance with various techniques. The mounting of the optical fiber cable segments in the structure provides for dimensional control over areas being processed. The fixture eliminates much of the handling of the optical fiber cable during processing which often contributes to breakage. An additional feature which may be included with the fixture of the invention is a coating fixture which enables coating of the segments with a the protective coating.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A fixture for holding, with a cured molding material, fiber optical cable for processing said fixture comprising:

a first frame having a plurality of first frame members with side walls defining a first processing aperture:

at least first and second spaced members of said plurality of first frame members for defining opposite boundaries of said first processing aperture about a central axis intermediate said first and second members and having one planar surface thereof lying in a common plane, and a set of first and second chambers formed in said first and second members respectively, each of said chambers opening to the surface forming the common plane and each of said first and second chambers being aligned along a support axis that is angularly displaced with respect to the central axis and that spans the processing aperture, each of said chambers receiving the molding material for positioning the fiber optic cable along the support axis spanning said first processing aperture;

second frame having a plurality of second frame members having side walls defining a second processing aperture, said plurality of second frame members and said second processing aperture are aligned and coextensive with said plurality of first frame members and said first processing aperture, means for attaching and locking said second frame to said first frame such that said second frame overlies at least said surface of said first and second members forming the common plane thereby to close said chambers, whereby the molding material prevents motion of the fiber optic cable along the support axes and said fixture thereby supports the fiber optic cable in the processing aperture for processing therethrough.

2. A fixture as recited in claim 1 wherein each of said chambers includes an enlarged central cavity and opposed slot portions disposed about said central cavity in alignment along the support axis, each of said cavity and slots being opened to the surfaces forming the common plane.

3. A fixture as recited in claim 2 further comprising spaced side members extending between said first and second spaced members defining second opposed boundaries of said processing aperture.

4. A fixture as recited in claim 3 wherein said first and second spaced members are linear members that extend substantially parallel to one another and said first and second spaced side members are parallel linear members that extend perpendicularly to said first and second spaced members and said locking means releasably connecting said first and second frames.

5. A fixture as recited in claim 1 wherein said first frame includes first and second spaced side members extending between said first and second spaced members, each of said first and second spaced side members having a planar surface substantially coplanar with said planar surface of said first and second spaced members and said second frame includes third and fourth spaced members and third and fourth spaced side members, each of said third and fourth members and said third and fourth side members having a planar surface that is coplanar surface for abutting said coplanar surface of said first frame upon overlaying of said first and second frames.

6. A fixture as recited in claim 5 wherein said processing aperture extends through said first and second frames and said third and fourth members and said third and fourth side members define boundaries of said processing aperture.

7. A fixture as recited in claim 1 wherein said second frame includes third and fourth spaced members each having a planar surface thereof lying in a common plane, said third and fourth spaced members abutting said planar surface of said first and second spaced members when said second frame overlies said first frame.

8. A fixture as recited in claim 7 wherein said third and fourth members include a set of third and fourth chambers, respectively, each of said chambers having an opening at said second planar surface and disposed to be substantially aligned with said first and second chambers, respectively, upon overlaying said first and said second frames.

9. A fixture as recited in claim 8 wherein said first frame includes a plurality of sets of said first and second chambers and said second frame includes a plurality of sets of said third and fourth chambers, such that said third and fourth chambers are adapted to receive additional molding material to hold fiber optic cable disposed therein after the overlying of the first and second frames.

10. A fixture as recited in claim 1 wherein said first and second members are elongated linear members and said chambers extend in substantially a transverse direction across said first and second members whereby the support axis spans said processing aperture substantially perpendicular to the central axis.

11. A fixture as recited in claim 1 further comprising a molding fixture adapted for insertion into said processing aperture for forming a mold cavity around fiber optic cable supported between said first and second frames and extending along the support axis.

12. A fixture as recited in claim 11 wherein said molding fixture means comprises first and second coating units insertable into said processing aperture from opposite sides thereof.

13. A fixture as recited in claim 12 wherein said cavities comprise counterfacing grooves in first and second molding units.

14. A fixture as recited in claim 1 further comprising molding fixture means for forming a mold cavity around a portion of each of the fiber optic cables spanning the process aperture and adapted for insertion into said processing aperture wherein the first frame further includes a plurality of sets of said first and second chambers, said molding fixture means including a coating unit having a first surface for overlying a surface opposed to said planar surface said first frame lying in the common plane.

15. A fixture according to claim 11 wherein said second frame includes third and fourth spaced members for defining opposed boundaries of a second processing aperture with each of said third and fourth spaced members having a surface lying in a common plane for abutting said planar surface of said first and second spaced members of said first frame in the common plane thereof upon overlaying of said first and second frames.

16. A fixture as recited in claim 15 wherein said molding fixture includes first and second coating units insertable into said processing apertures defined in said first and second frames respectively.

17. A fixture as recited in claim 1 wherein said first and second members have a plurality of sets of said first and second chambers formed therein for supporting segments of fiber optic cable in the processing aperture along the support axis.

18. A fixture as recited in claim 17 further wherein said second frame comprises third and fourth spaced members having planar surfaces on a common plane and a plurality of sets of third and fourth chambers opening to the common plane, said sets of third and fourth chambers aligning with said sets of first and second chambers upon overlaying said first and second frames.

* * * * *